United States Patent
Kormos et al.

[11] Patent Number: 6,034,371
[45] Date of Patent: Mar. 7, 2000

[54] SEMI-OPAQUE CHOPPER FOR THERMAL IMAGING SYSTEM AND METHOD

[75] Inventors: Alex L. Kormos, Allen; Charles M. Hanson, Richardson, both of Tex.

[73] Assignee: Raytheon Company, Lexington, Mass.

[21] Appl. No.: 08/987,735

[22] Filed: Dec. 9, 1997

Related U.S. Application Data

[60] Provisional application No. 60/033,441, Dec. 20, 1996.

[51] Int. Cl.⁷ ........................................................ G01J 5/08
[52] U.S. Cl. .......................... 250/351; 250/351; 250/233; 378/160
[58] Field of Search ..................................... 250/351, 233; 378/160

[56] References Cited

U.S. PATENT DOCUMENTS

| | | |
|---|---|---|
| 4,143,269 | 3/1979 | McCormack et al. . |
| 4,914,673 | 4/1990 | Imura ........................................ 250/351 |
| 4,931,745 | 6/1990 | Goff et al. . |
| 4,965,447 | 10/1990 | Bly et al. ................................. 250/351 |
| 5,021,663 | 6/1991 | Hornbeck ................................. 250/349 |
| 5,051,591 | 9/1991 | Trotta et al. . |
| 5,262,686 | 11/1993 | Kurosawa . |
| 5,365,354 | 11/1994 | Jannson et al. . |

FOREIGN PATENT DOCUMENTS

| | | |
|---|---|---|
| 0410745A1 | 1/1991 | European Pat. Off. . |
| 1297913 | 11/1972 | United Kingdom . |
| 2240000A | 7/1991 | United Kingdom . |

OTHER PUBLICATIONS

Raguin, et al., "Sublength Structured Surfaces and Their Applications", Critical Reviews of Optical Science and Technology vol. CR49, pp. 234–261 (1993).

U.S. Patent Application, "Infrared Chopper Using Binary Diffractive Optics", U.S. Serial No. 08/159,879, filed Nov. 30, 1993. (Attorney Ref. 004578.0525).

*Primary Examiner*—Constantine Hannaher
*Assistant Examiner*—Andrew Israel
*Attorney, Agent, or Firm*—Baker Botts L.L.P.

[57] ABSTRACT

Thermal imaging chopper (22) having a frame (42) with an open window (47) and a covered window (48). The covered window (48) is preferably covered with a material that partially blocks a selected amount of thermal radiation from a scene and randomly scatters the remaining thermal radiation from the scene that is transmitted through the covered window. The open window (47) allows unrestricted transmission of thermal radiation from the scene.

17 Claims, 1 Drawing Sheet

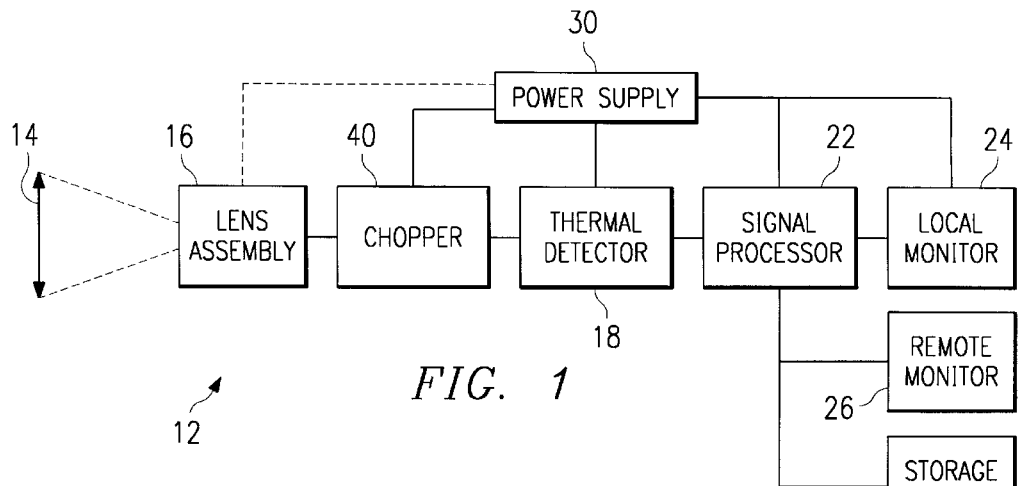
FIG. 1
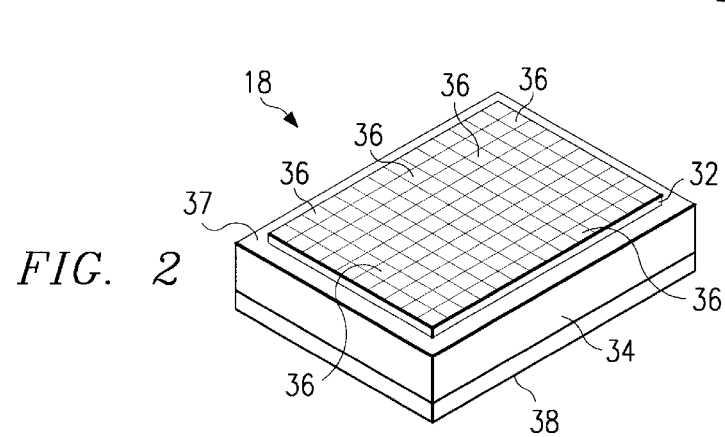
FIG. 2
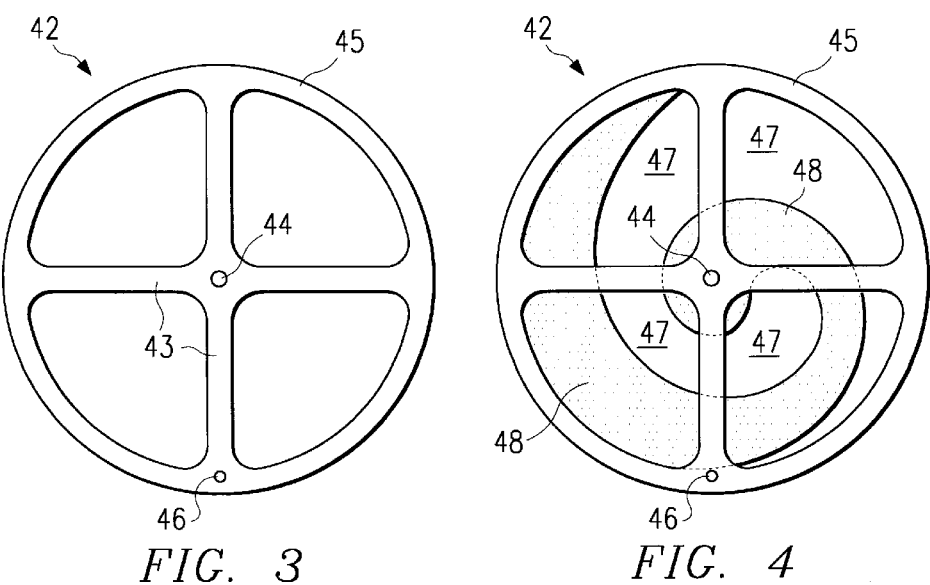
FIG. 3
FIG. 4

SEMI-OPAQUE CHOPPER FOR THERMAL IMAGING SYSTEM AND METHOD

CROSS-REFERENCE TO RELATED PATENTS AND APPLICATIONS

This application claims priority under 35 U.S.C. §119 of provisional application number 60/033,441 filed Dec. 20, 1996.

This application is related to: U.S. Pat. No. 5,051,591, "Reflective Chopper for Infrared Imaging Systems;" U.S. Pat. No. 4,143,269, "Ferroelectric Imaging System;" U.S. Pat. No. 5,021,663, "Infrared Detector;" which are assigned to Texas Instruments Incorporated. This application is also related the following copending U.S. Applications: Ser. No. 60/024,048, "Chopper for Thermal Imaging System and Method;" and Serial No. 08/159,879, "Infrared Chopper Using are assigned to Texas Instruments Incorporated.

TECHNICAL FIELD OF THE INVENTION

This invention relates generally to infrared, near infrared or thermal imaging systems, and more particularly to a thermal imaging chopper and method for normalizing thermal sensors.

BACKGROUND OF THE INVENTION

Thermal imaging systems are often employed to detect fires, overheating machinery, planes, vehicles and people, and to control temperature sensitive industrial processes. Thermal imaging systems generally operate by detecting the differences in thermal radiance of various objects in a scene and by displaying the differences as a visual image of the scene. Thermal imaging systems must effectively deal with the relatively small difference in thermal radiance between the objects in the scene as compared to the total thermal radiance emitted by the scene.

The basic components of a thermal imaging system generally include: optics for collecting and focusing thermal radiation from a scene; a thermal detector having a plurality of thermal sensors for converting thermal radiation to an electrical signal; and electronics for amplifying and processing the electrical signal into a visual display or for storage in an appropriate medium.

The thermal sensors of a thermal imaging system may be disposed in a focal plane array. The focal plane array and its associated thermal sensors are often coupled to an integrated circuit substrate with a corresponding array of contact pads and a thermal isolation structure disposed between the focal plane array and the integrated circuit substrate. The thermal sensors define the respective picture elements or pixels of the resulting thermal image.

One type of thermal sensor includes a thermal sensitive element formed from pyroelectric material which exhibits a state of electrical polarization and/or change in dielectric constant dependent upon temperature changes of the pyroelectric material in response to incident infrared radiation. A pair of thin film electrodes are generally disposed on opposite sides of the pyroelectric material to act as capacitive plates. In this arrangement, the pyroelectric material acts as a dielectric, or insulator, disposed between the capacitive plates. Accordingly, the electrodes are operable to measure the charge generated by the pyroelectric material in response to changes in temperature. As previously discussed, the charge, or electrical signal, may be amplified and processed into a visual display.

A chopper is often included in a thermal imaging system to dynamically couple the detector to the scene. The chopper rotates a series of windows through the thermal radiance from the scene. These windows alternately interrupt the thermal radiance from the scene to produce a constant background radiance. During the time period that the thermal radiance is interrupted, a reference signal is recorded from the focal plane array. During the time period that the thermal radiance is uninterrupted, a scene signal is recorded from the focal plane array. The electronic processing portion of the thermal imaging system will subtract the reference signal from the scene signal to produce a signal with a minimum of background bias.

Choppers can be either opaque or diffusing. During the reference signal phase of operation, the opaque chopper completely interrupts the thermal radiation from the scene to the focal plane array. Whereas, during the scene signal phase of operation, the thermal radiation is uninterrupted to the focal plane array. One disadvantage with the opaque chopper is that the difference in the reference signal from the scene signal includes a large DC signal component which corresponds to the total difference of the thermal radiance emitted by the scene relative to the opaque chopper. This forces both the focal plane array sensors and the electronic processing portion of the thermal imager to adjust to a wide thermal range during operation. In addition, the focal plane array sensors have a limited thermal dynamic range and the high DC component of the signal produced by the scene leaves less dynamic thermal range for actually representing the individual objects in the scene. A further problem with opaque choppers is that this large DC component of the signal gets multiplied by any gain non-uniformities in the detector, which then requires the electronic processing portion of the thermal imaging system to process the full DC component of the signal to compensate for these non-uniformities, which requires a higher digital resolution for an equivalent performance by a diffusing chopper system (in excess of 10 bits of digital processing).

Diffusing choppers have attenuated many of the problems observed with opaque choppers. Diffusing choppers differ from the opaque chopper in the amount of thermal radiation that they block. Instead of completely blocking thermal radiation from the scene during the reference signal phase of operation, a diffusing chopper uniformly averages or diffuses the thermal radiation from the scene across the focal plane array; thus, the term diffusing chopper.

A diffusing chopper system does not create a large DC signal component regardless of the scene condition. This dynamically couples the reference signal to the scene signal created by the detector. This is the most efficient and lowest cost signal processing architecture (as few as 8 bits of digital processing).

One problem with many diffusing choppers is that the chopper window utilized during the scene signal phase of operation is covered with the same transparent material that covers the chopper window during the reference signal phase of operation. The difference between scene signal and the reference signal chopper window is that the chopper window used during the reference signal includes a diffusing pattern. The materials used to cover the chopper windows are selected to be highly transparent to the thermal radiation from the scene, but they are not fully transparent. This creates a problem because the thermal radiation from the scene reaching the thermal sensors is attenuated during the scene signal phase of operation.

An additional problem with many diffusing choppers is that a residual signal artifact is created when the scene signal is subtracted from the reference signal as a result of fixed pattern noise that is common to both signals. Due to imperfect averaging of the thermal radiation from the scene during the reference signal phase, a "halo" artifact created. This artifact is undesirable in a thermal image.

A further disadvantage of many diffusing choppers is the expense of the high thermal transparency material, e.g. silicon or germanium, and the cost associated with a surface treatment of the material, e.g. binary lensets as described in U.S. patent application Ser. No. 60/024,048 entitled "Infrared Chopper Using Binary Diffractive Optics."

Additionally, many choppers often generate a background that is not uniform or that greatly differs from the thermal energy of the scene. A background signal that is not uniform may prevent adequate normalization of the thermal sensors. A background signal that substantially differs from the scene signal may expose the thermal sensors to a large dynamic range that degrades the quality of the image obtained from the scene.

SUMMARY OF THE INVENTION

Accordingly, a need has arisen in the art for an improved chopper. The present invention provides a semi-opaque chopper that substantially eliminates or reduces the disadvantages and problems associated with prior choppers.

In accordance with teachings of the present invention, a thermal imaging chopper may comprise a generally circular frame having multiple windows disposed within the frame. The windows being either open, allowing uninterrupted transmission of the thermal radiation from the scene, or covered with a material that allows only a portion of the thermal radiation from the scene to diffuse through the covered window.

In one embodiment, the chopper comprises two windows that are both in the general shape of an Archimedes spiral. The first window being open, allowing an uninterrupted beam of thermal radiation from the scene to pass through the thermal imaging chopper to the focal plane array. The second window being covered with a material that partially blocks thermal radiation from the scene and diffuses and randomly scatters the remaining thermal radiation from the scene onto a focal plane array. In accordance with particular embodiments, the material covering the covered window will block approximately 25–7596% of the thermal radiation from reaching the focal plane array. A material blocking approximately 36.5% of the thermal radiation has been found to be effective at reducing fixed pattern noise.

In a different embodiment, the chopper may have an abbreviated frame. In this embodiment, the material covering the covered window is sufficiently rigid that a supporting frame is not required. The abbreviated frame may be a single spoke attached to the covered window.

Another embodiment may have a chopper without a frame. As with an abbreviated frame, the material covering the covered window must be sufficiently rigid that no support is needed.

Important technical advantages of the present invention include providing a uniform background signal for normalization of the thermal sensors. In particular, a material having optimal characteristic for both blocking and diffusing selected amounts of the thermal radiation from the scene. The diffused thermal radiation provides a generally uniform background signal from which the thermal sensors may be normalized, thereby reducing the "halo" artifact.

In addition, the present invention has the technical advantage of providing a background signal partially related to the thermal energy of the scene. In particular, the chopper allows a portion of the thermal energy of the scene to pass through to the thermal sensors during normalization. This reduces the dynamic range to which the thermal sensors are subjected and improves the quality of the visual image signal obtained from the thermal sensors.

The present invention also has the technical advantage of allowing the full intensity of the thermal radiation to pass through the chopper during the open window phase of operation. This increases the intensity of the thermal energy from the scene detected by the thermal sensor which increases the quality and definition of the image obtained from the associated focal plane array.

A further technical advantage of the present invention includes providing a low cost thermal chopper. In particular, a polyethylene material may be used to cover the covered window and randomly scatter a portion of the thermal radiation allowed to pass therethrough.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which:

FIG. 1 is a schematic block diagram showing the components of an exemplary thermal imaging system constructed in accordance with teaching of the present invention;

FIG. 2 is a schematic drawing showing an isometric view of a typical thermal detector satisfactory for use in the thermal imaging system of FIG. 1, showing a focal plane array mounted to an integrated circuit substrate opposite a thermal element;

FIG. 3 is a plan view of a chopper frame and does not include a depiction of the open or closed windows;

FIG. 4 is a plan view of one embodiment of the present invention, showing a chopper having a frame in an open window and a covered window within the frame.

DETAILED DESCRIPTION OF THE INVENTION

The preferred embodiments of the present invention and its advantages are best understood by referring in more detail to FIGS. 1–4 of the drawings, in which like numerals refer to like parts throughout the several views. FIG. 1 shows a schematic block diagram of thermal imaging system 12 constructed in accordance with teachings of the present invention. During operation, thermal imaging system 12 detects, processes, and displays an image corresponding to thermal radiation from scene 14.

Thermal imaging system 12 may be especially useful when visual wavelengths are not unavailable for imaging, such as in the dark or when vision is impaired by smoke, dust, or other particles. In such conditions, thermal imaging system 12 may detect thermal radiation in a selected infrared range. The infrared range is preferably a wavelength region in the electromagnetic spectrum where there is good transmission of infrared radiation through the atmosphere. Typically, infrared detectors sense electromagnetic radiation in the infrared spectrum from spectral bands of 3 to 5 $\mu$m (having an energy of 0.4 to 0.25 ev) and/or 8 to 14 $\mu$m (having an energy of 0.16 to 0.09 ev). The 3–5 $\mu$m spectral band is generally termed the "near infrared band" while the 7 to 14 μm spectral band is termed the "far infrared band." Infrared radiation between the near and far infrared bands cannot normally be detected due to atmospheric absorption. Thermal imaging system 12, however, is also useful during the day and when vision is possible by means of visible electromagnetic wavelengths. For example, the thermal imaging system 12 may be used to detect fires, overheating machinery, planes, vehicles and people and to control temperature sensitive industrial processes.

As shown in FIG. 1, thermal imaging system 12 may comprise lens assembly or optics 16 in optical communication with thermal detector 18. Lens assembly 16 focuses or directs thermal radiation emitted by the scene 14 onto the thermal detector 18. Lens assembly 16 may include one or more lenses or optical components made of material that transmits thermal radiation, such as germanium. The design of lens assembly 16 may be varied depending on the particular use of thermal imaging system 12. For example, lens assembly 16 may have a constant or a variable F-number and/or may be a single field of view or a zoom lens.

Thermal detector 18 may be cooled or uncooled. A cooled thermal detector is operated at cryogenic temperatures such as at the temperature of liquid nitrogen, to obtain the desired sensitivity to variations in infrared radiation from scene 14.

A significant feature of the invention is the construction of chopper 40, which will be described in more detail below. Chopper 40 may be disposed between lens assembly 16 and thermal detector 18. Preferably, lens assembly 16, thermal detector 18 and chopper 40 are contained within an associated housing (not shown). Thermal detector 18 may also be contained within a vacuum environment or an environment of low thermal conductivity gas.

The placement of lens assembly 16 and chopper 40 with respect to thermal detector 18 is accomplished using well known principles of optical design as applied to thermal imaging systems. As previously described, lens assembly 16 focuses thermal radiation emitted by scene 14 onto thermal detector 18. Thermal detector 18 translates the incoming thermal radiation into corresponding electrical signals for processing.

The electrical signals of thermal detector 18 may be passed to signal processor 22, which assembles electrical signals into video signals for display. Signal processor 22 may also synchronize operation of chopper 40. This synchronization enables signal processor 22 to subtractively process incoming thermal radiation from scene 14 to eliminate fixed background radiation. The output of signal processor 22 is often a video signal that may be viewed, further processed, stored, or the like.

The video signal produced by signal processor 22 may be viewed on local monitor 24 or fed to remote monitor 26 for display. Local monitor 24 may be an eye piece containing an electronic viewfinder, a cathode ray tube, or the like. Similarly, remote monitor 26 may comprise an electronic display, a cathode ray tube, such as a television, or any other type of device capable of displaying the video signal. The video signal may also be saved in storage medium 28 for later recall. Storage medium 28 may be a compact disk, a hard disk drive, random access memory, or any other type of medium capable of storing electronic video signals for later recall. Monitors and storage mediums are well known in the art and therefore will not be further described.

Electrical power to operate thermal imaging system 12 may be provided by power supply 30. Power supply 30 provides electrical power directly to chopper 40, thermal detector 18, signal processor 22, and local monitor 24. Electrical power may also be provided to lens assembly 16, when, for example, a motor is employed to zoom lens assembly 16.

FIG. 2 is a schematic drawing showing an isometric view of one embodiment of thermal detector 18. Thermal detector 18 may comprise focal plane array 32 mounted to substrate 34. The configuration of focal plane array 32 generally varies for different types of thermal detectors 18. In a "staring" thermal detector, for example, the entire thermal image is focused onto a large focal plane array. By contrast, a "scanning" thermal detector uses a mirror or similar means to sweep successive portions of the thermal image across a small focal plane array. Usually, although not necessary for the present invention, both types of thermal detectors consist of a number of thermal sensors 36, with the output of each thermal sensor 36 representing a portion of scene 14. For example, the output of each thermal sensor 36 in focal plane array 32 may represent a single pixel of the total image corresponding to scene 14. This embodiment may be particularly beneficial for use in connection with producing high density visual displays.

Substrate 34 may be an integrated circuit substrate that provides the necessary electrical couplings and circuitry to control chopper 40 and to process a thermal image formed on focal plane array 32. Integrated circuit substrate 34 may be formed from silicon, ceramic alumina, or other suitable materials which are both chemically and thermally compatible with the multiple layers which will be formed on surface 37 of integrated surface substrate 34. Further information regarding thermal sensors mounted on an underlying integrated circuit substrate is disclosed by U.S. Pat. No. 4,143,269 issued to McCormack, et al., entitled "Ferroelectric Imaging System" and U.S. Pat. No. 5,021,663 issued to Hornbeck, entitled "Infrared Detector."

For an embodiment in which thermal detector 18 is uncooled, thermal element 38 may be provided to maintain integrated circuit substrate 34 at a constant predefined temperature. The constant temperature prevents ambient or internally generated temperature gradients from affecting the output of thermal sensors 36 and thus provides a baseline with which the thermal energy of scene 14 can be accurately measured. The necessary electrical couplings and circuitry to control thermal element 38 may be provided by integrated circuit substrate 34. In such a case, thermal element 38 may be coupled to integrated circuit substrate 34 opposite from focal plane array 32.

Focal plane array 32 may include a matrix of thermal sensors 36. In one embodiment, the quantity and location of thermal sensors 36 may depend upon the N by M configuration desired for focal plane array 32. Each thermal sensor 36 may form a discrete element of the focal plane array 32. Thermal sensors 36 may detect thermal radiation using various techniques. For example, thermal sensors 36 may be based upon the generation of a charge due to a change in temperature resulting from thermal radiation heating each thermal sensor 36. Alternatively, thermal sensors 36 may be based upon the generation of a charge due to a photon-electron interaction within the material used to form thermal sensors 36. This latter effect is sometimes called the internal photoelectric effect. Thermal sensors 36 may also be based upon the change in resistance of a thin conductor caused by the heating effect of thermal radiation from scene 14. Such thermal sensors 36 are sometimes referred to as bolometers. It will be understood that these and other types of thermal sensors may be used in accordance with teaching of the present invention.

FIG. 3 is a detailed view of frame 42. Frame 42 has a generally circular configuration formed by two circular pieces that are bonded together (not shown). Frame 42 may include a center 44 and a rim 45 with multiple spokes 43 radiating from center 44 out to rim 45. In one embodiment frame 42 includes four spokes 43 radiating from center 44 out to rim 45. In another embodiment spokes 43 may be in the shape of an Archimedes spiral (not shown). Frame 42 may also include an indexing mark 46 in rim 45 for indexing chopper 40 with signal processor 22. In another embodiment, frame 42 may be abbreviated and include only a single spoke 43. In this embodiement, frame 42 may not include rim 45, and indexing mark 46 may be located in covered window 48 (not shown in this drawing) Prior semi-opaque choppers 40 included a highly transparent material covering the entire frame 42 and which formed windows through the use of a diffusing pattern on the window.

As previously described, a significant feature of the present invention is the construction of chopper 40 with open window 47 and covered window 48. As shown by FIG. 4, chopper 40 may comprise frame 42. Covered window 48 may be coupled to frame 42. Frame 42 and covered window 48 cooperate with each other to form at least one edge of open window 47. Covered window 48 includes material that will block a select amount of thermal radiation from scene 14 and generally uniformly diffuse the remainder. Open window 47 allows uninterrupted transmission of thermal radiation from scene 14 onto focal plane array 32.

Chopper 40 may be rotatably mounted at center 44 of frame 42. As chopper 40 is rotated, closed window 48 and open window 47 are periodically disposed between scene 14 and focal plane array 32. Accordingly, covered window 48 will periodically interrupt a portion of the thermal radiation from scene 14 and generally diffuse the rest of the thermal radiation on to focal plane array 32. Interruption and diffusing of thermal radiation from scene 14 can be used to normalize thermal sensors 36 in focal plane array 32. Accordingly, thermal sensors 36 are normalized during each revolution of the chopper 40. Chopper 40 may be synchronized with signal processor 22 by indexing mark 46 in rim 45.

Frame 42 may have substantially planar opposing sides and be substantially round in shape. It will be understood that frame 42 may be other shapes and configurations capable of forming covered window 48 and open window 47.

Covered window 48 may have substantially planar opposing sides and have the general shape of an Archimedes spiral. In this shape, covered window 48 may sequentially interrupt transmission of thermal radiation from scene 14 to respective thermal sensors 36. Accordingly, thermal sensors 36 may be normalized sequentially. This allows the electrical signal of each thermal sensor 36 to be read and processed sequentially. If desired, chopper 40 may include two or more open windows 47 and two or more covered windows 48. Each covered window 48 will allow normalizing each thermal sensor 36 once for each revolution of chopper 40. It will be understood that covered window 48 may be in any other shape or configuration that is capable of interrupting and diffusing the transmission of thermal radiation from scene 14.

Covered window 48, as previously described, may be formed of a polymer that is semi-opaque to thermal radiation. The polymer may be polyethylene, polypropylene or similar compounds used to form relatively thin layers of film. In one embodiment, the polymer used to form covered window 48 may be polyethylene that blocks approximately 36.5% of the thermal radiation from scene 14. A benefit of using polymer material to form covered window 48 is that it is relatively inexpensive to manufacture. It will be understood, however, that other semi-opaque film type materials may be satisfactorily used in accordance with the present invention.

As previously described, covered window 48 may block a selected portion of the thermal radiation from scene 14 and generally uniformly diffuse the remaining portion of the thermal radiation. As used herein, the term "diffuse" means to diffract, blur, unfocus or otherwise distort thermal radiation from scene 14 onto focal plane array 32. As described in U.S. patent application Ser. No. 08/159,879 entitled "Infrared Chopper Using Binary Diffractive Optics," covered window 48 may comprise material having a series of small lenses, or lenslets, that focus the thermal energy away from the focal plane array 32. As described in U.S. patent application Ser. No. 60/024048 entitled "Chopper for Thermal Imaging System and Method," covered window 48 may comprise material having a surface relief pattern that blocks and diffuses thermal radiation transmitted from scene 14 onto focal plane array 32.

Open window 47 may have the general shape of an Archimedes spiral. In accordance with teachings of the present invention, open window 47 is a cut-out within the frame 42, having a border defined in part by closed window 48. Thermal radiation may pass through open window 47 without any interruption and be received on focal plane array 32 without loss in intensity. Open window 42 may also be a non-structured area of the frame 42. It will be understood that open window 47 may be in any shape or configurations provided that there is no interruption or attenuation of the thermal radiation from scene 14 onto focal plan array 32.

Although the present invention has been described with several embodiments, various changes and modifications may be suggested to one skilled in the art. It is intended that the present invention encompass such changes and modifications as fall within the scope of the following claims.

What is claimed is:

1. A thermal imaging chopper, comprising:
   at least one open window and at least one covered window;
   the covered window formed in part bv a thermally transmissive material, operable to scatter radiant thermal energy from a scene; and
   the thermally transmissive material having at least one edge which defines in part the open window;
   wherein the transmissive material is manufactured from a polymer.

2. The thermal imaging chopper of claim 1, wherein the transmissive material randomly scatters radiant thermal energy from the scene.

3. The thermal imaging chopper of claim 1, wherein the transmissive material is manufactured from a material that transmits 25–75% of the radiant thermal energy.

4. The thermal imaging chopper of claim 1, Wherein the transmissive material is manufactured from a material transparent to far infrared radiant energy.

5. The thermal imaging chopper of claim 1, wherein the transmissive material is manufactured from a material transparent to infrared radiant energy.

6. The thermal imaging chopper of claim 1, wherein the open window is in the general shape of an Archimedes spiral.

7. The thermal imaging chopper of claim 1, wherein the thermal imaging chopper further comprises a frame having a generally circular configuration.

8. The thermal imaging chopper of claim 1, wherein the thermal imaging chopper further comprises a frame having multiple sections with portions of the open window and the closed window extending through each section.

9. A thermal imaging chopper, comprising:
   at least one open window and at least one covered window;
   the covered window formed in part by a thermally transmissive material, operable to scatter radiant thermal energy from a scene; and
   the thermally transmissive material having at least one edge which defines in part the open window;
   wherein the transmissive material is manufactured from polyethylene.

10. A thermal imaging chopper, comprising:
    a frame;
    an opening within the frame which does not restrict the transmission of thermal energy;
    a covered window disposed within the opening; and
    a thermally transparent material connected to the frame to define the covered window, to partially block radiant thermal energy and to randomly scatter the radiant thermal energy not blocked;
    wherein the thermally transparent material is manufactured from polyethylene.

11. The thermal imaging chopper of claim 10, wherein the thermally transparent material further comprises a surface pattern to scatter radiant thermal energy.

12. The thermal imaging chopper of claim 10, wherein the thermally transparent material is manufactured from a material that blocks 25–75% of the radiant thermal energy.

13. The thermal imaging chopper of claim 10, further comprising:
    the frame having a generally circular configuration with an outside diameter and a center;
    the frame divided into four approximately equal quadrants extending from the center of the circle to the outside diameter; and
    a portion of the covered window extending through each quadrant.

14. A method of forming a thermal imaging system having a focal plane array with a plurality of thermal sensors to produce an image of a scene in response to incident thermal radiation from the scene and for normalizing the thermal sensor, comprising the steps of:
    focusing a beam of radiant thermal energy from a scene onto the focal plane array;
    placing a thermal imaging chopper having a frame within the beam of radiant thermal energy before the beam contacts the focal plane array;
    forming an open window that does not restrict the beam of radiant thermal energy within the frame;
    forming a closed window within the frame covered by a thermally transparent material that partially blocks the beam of radiant thermal energy and randomly scatters the radiant thermal energy not blocked by the material;
    rotating the frame at a selected speed to allow the beam of radiant thermal energy to contact the focal plane array without interruption through the open window to provide a signal corresponding to the scene;
    rotating the frame at the selected speed to allow the closed window to scatter the beams of radiant thermal energy to provide a generally uniform level of thermal energy contacting the thermal sensor to provide a normalized background signal for comparison with the uninterrupted signal from the scene; and
    forming the covered window from a polymer material that operates to randomly scatter and partially block radiant thermal energy from the scene.

15. The method of claim 14, further comprising the steps of forming the covered window from a material that transmits 25–75% of the radiant thermal energy from the scene.

16. The method of claim 14, further comprising the steps of forming the covered window to define in part an Archimedes spiral.

17. A method of forming a thermal imaging system having a focal plane array with a plurality of thermal sensors to produce an image of a scene in response to incident thermal radiation from the scene and for normalizing the thermal sensor, comprising the steps of:
    focusing a beam of radiant thermal energy from a scene onto the focal plane array;
    placing a thermal imaging chopper having a frame within the beam of radiant thermal energy before the beam contacts the focal plane array;
    forming an open window that does not restrict the beam of radiant thermal energy within the frame;
    forming a closed window within the frame covered by a thermally transparent material that partially blocks the beam of radiant thermal energy and randomly scatters the radiant thermal energy not blocked by the material;
    rotating the frame at a selected speed to allow the beam of radiant thermal energy to contact the focal plane array without interruption through the open window to provide a signal corresponding to the scene;
    rotating the frame at the selected speed to allow the closed window to scatter the beams of radiant thermal energy to provide a generally uniform level of thermal energy contacting the thermal sensor to provide a normalized background signal for comparison with the uninterrupted signal from the scene;
    providing optics for focusing incident thermal radiation emitted by the scene onto the focal plane array;
    mounting the focal plane array including the plurality of thermal sensors on a substrate with electronic circuits for receiving and processing electrical signal from the thermal sensors to obtain a video signal representing differences in radiance of thermal energy emitted by objects in the scene; and
    displaying the video signal and displaying an image generated in response to the video signal.

* * * * *